G. W. BORDEN AND L. W. OWEN.
SECTIONAL FLYWHEEL.
APPLICATION FILED JAN. 8, 1919.
1,325,778.
Patented Dec. 23, 1919.
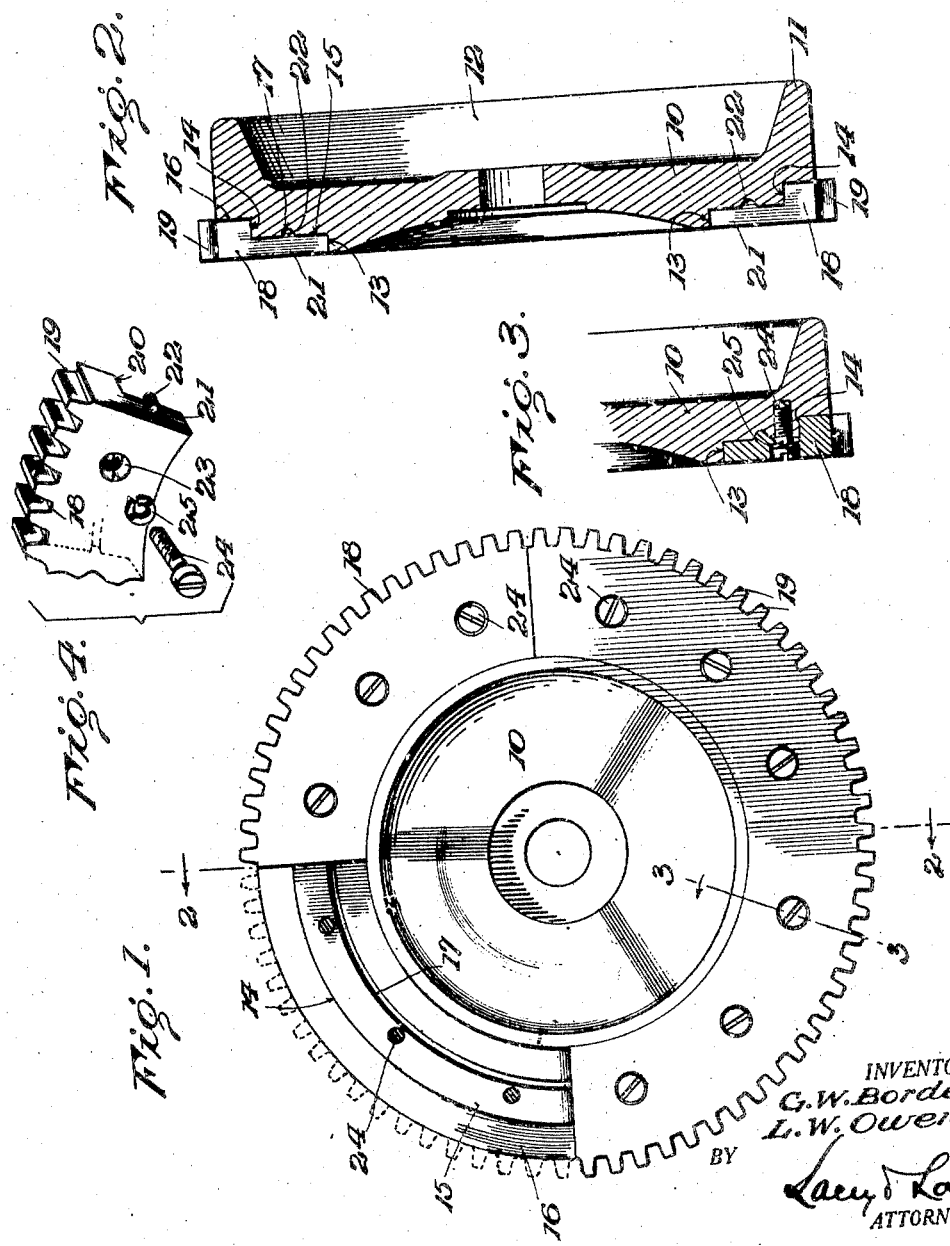
INVENTORS
G. W. Borden and
L. W. Owen
BY
Lacy & Lacy
ATTORNEYS

UNITED STATES PATENT OFFICE.

GEORGE W. BORDEN AND LEWIS W. OWEN, OF STEUBENVILLE, OHIO.

SECTIONAL FLYWHEEL.

1,325,778. Specification of Letters Patent. Patented Dec. 23, 1919.

Application filed January 8, 1919. Serial No. 270,206.

*To all whom it may concern:*

Be it known that we, GEORGE W. BORDEN and LEWIS W. OWEN, citizens of the United States, residing at Steubenville, in the county of Jefferson and State of Ohio, have invented certain new and useful Improvements in Sectional Flywheels, of which the following is a specification.

This invention relates to an improved sectional fly wheel for automobile engines, the engines of motor boats or the like.

As is well known, automobile engines equipped with a self-starter employ gear teeth upon the engine fly wheel and power is transmitted from the motor of the self-starter to these gear teeth to turn the fly wheel and consequently turn the engine crank shaft to start the engine. Heretofore, it has been common to form the gear teeth of the fly wheel integral therewith. Consequently, when the teeth become stripped, as very often happens, are broken off, or their efficiency otherwise impaired, it becomes necessary to remove the engine from the vehicle and install a new fly wheel. The present invention has as its primary object, therefore, to provide a fly wheel employing a detachable gear ring formed of a plurality of sections so that upon the impairment of any of the teeth of the ring, the particular section carrying the defective teeth may be removed and a new section substituted therefor without the necessity of removing the vehicle motor or displacing the fly wheel.

The invention has as a further object to provide a construction wherein the sections of the gear ring will be connected with the fly wheel each by individual fastening devices so that any one of the sections may be displaced without loosening the other sections.

And the invention has as a still further object to provide a wheel wherein the gear ring will be firmly mounted and rigidly supported upon the wheel body.

Other and incidental objects will appear during the course of the detailed description of the invention. In the drawings, wherein I have illustrated the preferred embodiment of the invention, and wherein similar reference characters designate corresponding parts throughout the several views:

Figure 1 is a front elevation of our improved fly wheel showing one of the sections of the gear ring removed, Fig. 2 is a vertical sectional view taken on the line 2—2 of Fig. 1 and particularly illustrating the mounting of the gear ring, Fig. 3 is a fragmentary sectional view taken on the line 3—3 of Fig. 1 and showing a typical fastening employed for connecting the gear ring with the wheel body, and Fig. 4 is a fragmentary perspective view showing a portion of one of the sections of the gear ring as well as one of the fastening devices employed for connecting the ring with the wheel body.

In carrying the invention into effect we employ a wheel body 10 comprising a hub, web and peripheral portion. Projecting laterally at one side of the wheel body is a peripheral flange 11 beveled out upon its inner side to provide a clutch face 12. The manner in which a clutch is adapted to coact with this flange will be well understood. The wheel is designed to be keyed or otherwise fixed upon an engine crank shaft in any approved manner.

Upon its forward side the wheel body 10 is cut away adjacent its periphery to provide stepped annular ledges or shoulders 13 and 14 respectively, a flat face 15 being thus defined between the ledges and a second flat face 16 between the ledge 14 and the periphery of the wheel. Formed in the face 15 medially thereof is an annular groove 17 concentric to the axis of the wheel. Removably secured upon the wheel body to fit the stepped ledges thereof as well as the faces 15 and 16, is a gear ring 18 which, as particularly shown in Fig. 1, is formed of a plurality of sections or segments. We have illustrated the use of four such sections. However, it will, of course, be understood that the number of these sections to be employed may be readily varied. At its periphery, the gear ring is formed with gear teeth 19 adapted to coact with a suitable drive gear upon the shaft of a starting motor while, upon its inner side, the ring is cut away for the major portion of its width to define an annular shoulder 20 from which extends a flange 21. Thus, as will be seen, the ring is substantially L-shaped in cross section and formed upon the flange 21 at its inner side and spaced from the shoulder 20, is an annular locking rib 22. This rib is, as particularly brought out in Figs. 2 and 3 of the drawings, adapted to engage snugly within the channel 17 of the wheel body for locking the gear ring against outward radial movement thereon when the outer edge of the flange 21 will abut the ledge 13 of the wheel body while the shoulder 20 of the gear ring will rest upon the ledge 14 for centering the ring upon the wheel body, the gear ring lying flush with the body of the wheel at its forward side.

Formed in the flange 21 of the gear ring at its outer side is a plurality of spaced concentric sockets 23 and fitted through the ring to engage the wheel body are cap screws 24, the heads of which are countersunk in said sockets. These cap screws are disposed immediately at the outer side of the rib 22 and, as will be clear, may be adjusted for tightly clamping the inner side of the ring adjacent its periphery against the flat face 16 of the wheel body and also tightly clamping the flange 21 of the ring against the wheel face 15. Disposed within the sockets 23 to surround the cap screws are spring locking washers 25 for holding the screws in adjusted position. Thus, it will be seen that the ring will be securely connected with the wheel body and rigidly supported thereon. Thrust upon the gear ring will be sustained, in large degree, by the locking rib 22 and groove 17 so that undue strain upon the fastening devices 24 will be prevented. Furthermore, the locking rib and groove will take care of any expansion or contraction of the wheel body and gear ring. At their ends, the sections of the ring, as shown in Fig. 1, abut and, as also brought out in this figure, each of the sections is connected with the wheel body by individual fastening devices. Consequently, when any of the gear teeth 19 of the ring become stripped, broken off, or their efficiency otherwise impaired, the particular section of the ring carrying the defective teeth may, without molesting any of the other sections, be displaced and a new section substituted therefor. Furthermore, this operation may be accomplished without the necessity for displacing a vehicle motor equipped with the improved wheel or removing the wheel from the motor shaft. We accordingly provide a highly effective construction for the purpose set forth and a wheel making it readily possible to repair the gear connection between an engine fly wheel and a starting motor.

Having thus described the invention, what is claimed as new is:

1. In a sectional wheel, the combination of a wheel body provided with stepped ledges defining relatively offset parallel faces, the inner face being wider than the outer face and being provided with a groove, a gear ring cut away at one side to define stepped inner and outer parallel faces fitting said first mentioned faces and separated by a shoulder coacting with the outermost of said ledges, the inner peripheral edge of the ring engaging the other of said ledges, a medial rib projecting from the inner of said faces of the ring and engaging in said groove, and means securing the ring in position.

2. In a sectional wheel, the combination of a wheel body stepped to provide relatively offset faces, a sectional gear ring extending around the peripheral margin of the wheel body and stepped to provide relatively offset faces coacting with said first mentioned faces, the body of the ring lying within the lines of the wheel body, and means securing the sections of the ring upon the wheel body.

In testimony whereof we affix our signatures.

GEORGE W. BORDEN. [L. S.]
LEWIS W. OWEN. [L. S.]